United States Patent [19]
Karney

[11] 3,992,628
[45] Nov. 16, 1976

[54] COUNTERMEASURE SYSTEM FOR LASER RADIATION

[75] Inventor: James L. Karney, Oxnard, Calif.

[73] Assignee: The United States of America as represented by the Secretary of the Navy, Washington, D.C.

[22] Filed: July 17, 1972

[21] Appl. No.: 271,313

[52] U.S. Cl. .............................. 250/338; 252/300; 343/18 A
[51] Int. Cl.$^2$ .......................................... G01J 1/00
[58] Field of Search ................. 332/7.51; 343/18 A, 343/18 E; 356/208; 250/338; 252/300

[56] References Cited
UNITED STATES PATENTS
3,499,159   3/1970   Carrier et al. ...................... 250/217

OTHER PUBLICATIONS

J. De Ment, *Directed Energy Weapons*, in Electronic Industries, pp. 92–96, Aug. 1962.

J. D. Anderson, Jr., et al., $CO_2$ *Laser Radiation Absorption Etc.*, NOLTR 72–172, Aug. 1972.

K. G. Leib, *Determination of the Attenuation of Laser Etc.*, NTIS AD 756 205, Jan. 1973.

Landman, A. et al. *Light Modulation by Means of Stark Effect, etc.*, In Applied Physics Letters 15(11) pp. 357–360 Dec. 1, 1969.

Primary Examiner—T.H. Tubbesing
Attorney, Agent, or Firm—Richard S. Sciascia; Joseph M. St.Amand

[57] ABSTRACT

A system for significantly reducing the laser energy striking an illuminated target such that the reflected target energy is reduced in intensity for seriously degrading the performance of energy seeking devices by introducing into a known laser path a gas or vapor material having laser absorbing and attenuating properties.

11 Claims, 2 Drawing Figures

COUNTERMEASURE SYSTEM FOR LASER RADIATION

BACKGROUND OF THE INVENTION

The present invention is related to countermeasures and particularly to an effective countermeasure against laser beam target designators. A laser beam target designator is a device for sending a laser beam to a target for attracting laser homing weapons. Laser energy is reflected from a target and the reflected laser energy when detected by a laser guided weapon is used for homing in on the target.

The objective of the countermeasure technique is to introduce within a known laser path, a material (gas or vapor) having sufficient absorbing properties to significantly reduce the laser energy striking the illuminated target. Consequently, the reflected target energy is reduced in intensity and the returning scattered energy will undergo a second attenuation if it passes a second time through the volume of absorbing medium. Reduced laser energy levels and blanked laser beam pulses can seriously degrade the performance of most laser energy seeking guidance devices and range finders presently being employed for tactical missions. Presently there is no other known system in existence that could accomplish this feat of laser beam attenuation within the framework of economy, efficiency and utility that this system provides.

SUMMARY OF THE INVENTION

The system of this invention is for interposing a non-toxic aerosol material between a laser source and a target to attenuate the laser beam without providing a visible trace of the absorbing medium.

Other objects, advantages and novel features of the invention will become apparent from the following detailed description when considered in conjunction with the accompanying drawings.

DESCRIPTION OF THE PREFERRED EMBODIMENT

The physical mechanism that distinguishes this system of laser attenuation from simple aerosol scattering is sometimes referred to as resonance absorption. A molecular species whether liquid or vapor in form, has an associated electronic, vibrational or rotational spectra characteristic of the material.

Upon illuminating the liquid or vapor with optical energy at one of the characteristic emission lines, the incident energy is absorbed with a subsequent redistribution of the energy into one of the vibrational or rotational states. Re-emission over 4 $\pi$ steradians may occur, with a depopulation of the vibrational states, but at a longer wavelength than the original. Thus, the inelastic qualities of this type of absorption-scattering prevent the instantaneous re-emission of the original optical energy.

Regular aerosol scattering is characterized by an absorption and instantaneous re-emission at the same wavelength.

Conventional smoke bombs or aerosol fogs, when deployed in the same manner as in the present system, could serve as attenuating mechanisms. However, the radiation scattered by non-absorbing aerosols could render the beam more detectable but would also constitute a visible target similar to a white cloud or smoke puff. This factor may be of importance when it is necessary to keep one's position inconspicuous or covert to an enemy.

The objective of using an absorbing vapor or gas is to provide a more efficient means of attenuating the laser beam without providing a visible trace of the absorbing medium. The vapor or material used for this application should also be non-toxic.

Figure 1:
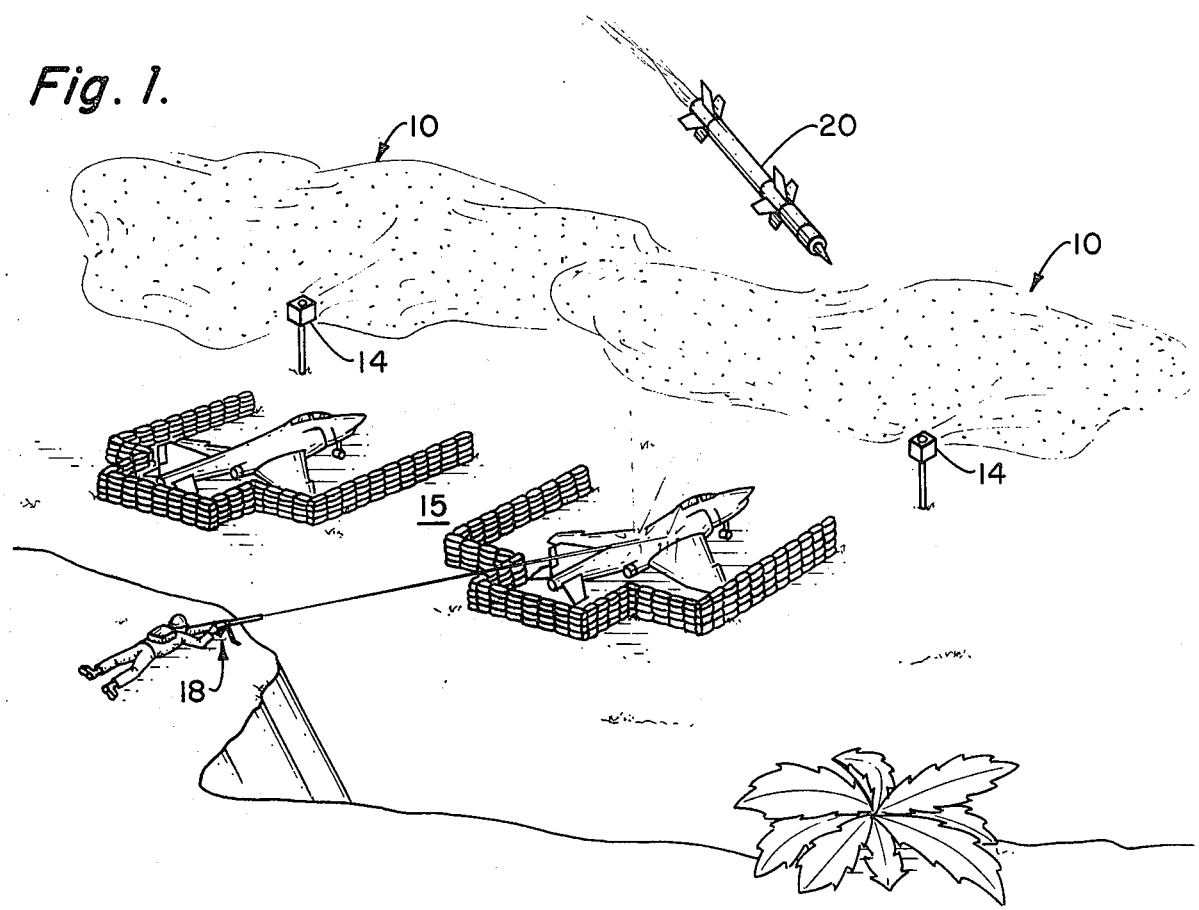
FIG. 1 illustrates one embodiment of the countermeasure system of the present invention wherein an aerosol screen is dispersed into the atmosphere above ground targets by means of ground based aerosol generators.
Figure 2:
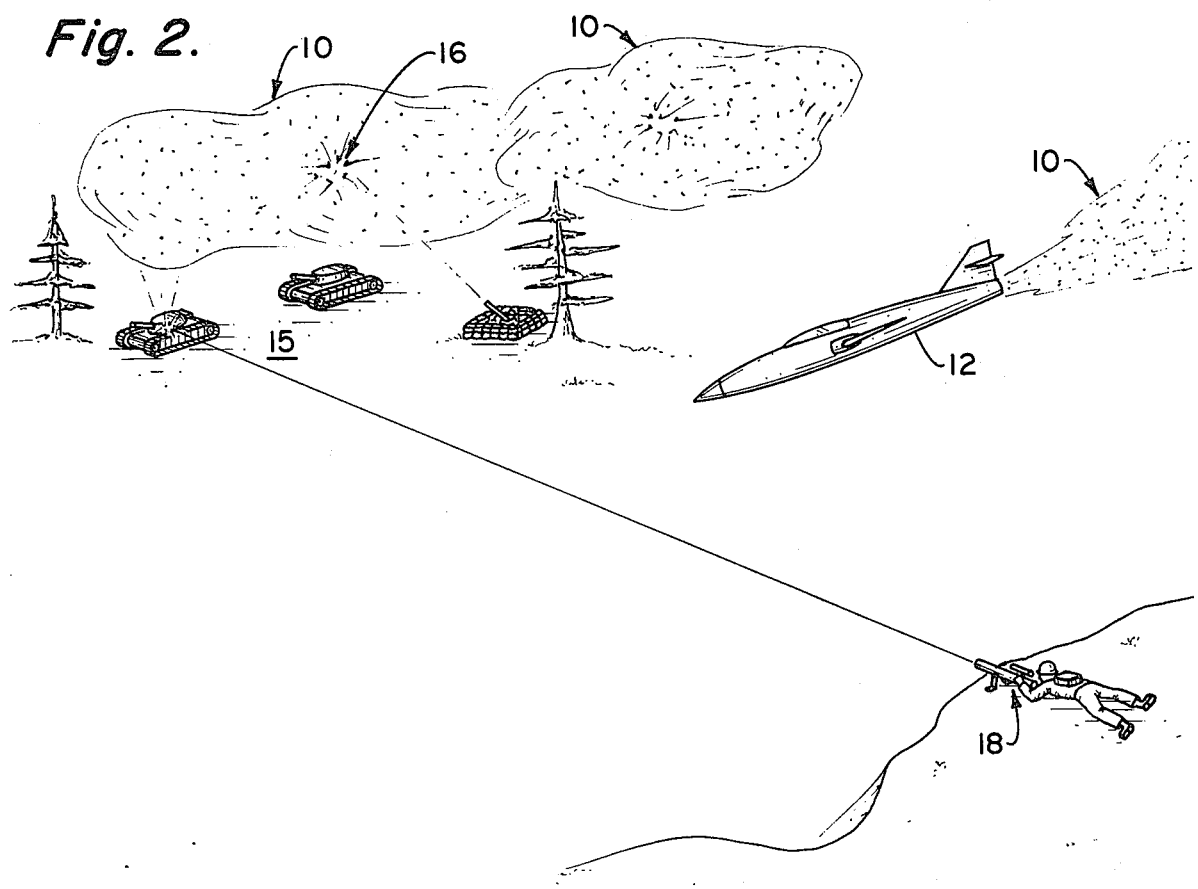
FIG. 2 illustrates other embodiments wherein resonance absorbing aerosol is dispersed by exploding mortar canisters and by spraying from aircraft.

The deployment of the laser absorbing vapor 10 is accomplished by using conventional ordnance for gas or smoke screen delivery, sprayed from aircraft 12, or with a ground based agricultural type aerosol generator 14, as illustrated in FIGS. 1 and 2. The type of means best suited for remote delivery to positions surrounding a strategic site 15 is the aerial detonating mortar canister 16, presently used for delivery of smoke screens and anti-personnel bombs as shown in FIG. 2. The actual delivery mode is predicated upon the tactical situation.

A perimeter defense using the absorbing vapor 10, has a particular advantage in that knowledge of the exact position of the enemy designator 18 is not necessary. A deployment tactic would consist of having ground based aerosol generators 14 located at intervals along a perimeter surrounding a protected site. One or several of these sources can be turned on when warned of enemy laser operations for protection of strategic sites against laser energy seeking guidance devices 20 and range finders.

A series of experiments have been made examining the absorption behavior of several species of chemicals at the 1.06 micron laser wavelength. These chemicals were selected for testing on the basis of known infrared spectroscopic data. A chemical, although liquid at room temperature, can be vaporized by simple atomization or heating. The mechanism of absorption and spectral characteristics usually remains unchanged for large clusters of molecules forming the aerosol. Some changes in spectral linewidths and positions do occur when going from the liquid phase to vapor phase. Thus, the necessity of performing an experiment using the narrow linewidth and short pulse duration of a Q-switched, 1.06 micron laser.

Experimental results verified the existence of several nontoxic liquid materials suitable for use in the above described system. However, one of these materials, designated 406B, showed superior performance. The composition and proportion of the constituents in 406B can be varied 10% to 20% of that shown with marginal difference in the result. The composition of 406B is as follows:

| | |
|---|---|
| Isopropyl alcohol | 80% |
| Butyl Cellosolve | 15% |
| Ethylene glycol | 5% |

Experiment has verified the existence of certain aerosol or vapor compounds have the capability of absorbing 1.06 micron laser radiation. These materials are Isopropyl alcohol, methyl alcohol, CuCl, $Cu(N)_{32}$, and also a special mixture of isopropyl alcohol (80%), Butyl Cellosolve (15%), and ethylene glycol (5%) and designated mixture 406B.

All of these materials offer some absorption at the 1.06 micron wavelength. However, the compound designated 406B was found to be the most satisfactory. Calibration tests were made before and after each chemical was separately tested.

The results for the first four chemicals named were somewhat inconclusive; that is, a small loss, 12% or less, could be measured but it was not certain what portion of this was attributable to scattering. The special mixture, 406B, revealed an unmistakable beam attenuation. The transmission through a sample of vapor was calculated from:

$$\frac{V_{SIR}}{V_{NDIR}} = \frac{T_S}{T_{ND}}$$

where $V_{SIR}$ = ratio of peak sample voltage to peak reference voltage $V_{NDIR}$ = ratio of peak voltage from a neutral density filter to reference voltage $T_S$ = transmission of sample $T_{ND}$ = transmission of neutral density filter.

It was determined that mixture 406B had an average transmission of 23% or an attenuation of 77%. Some portion of this figure is undoubtedly the result of beam scattering and the remainder attributed to absorption. An indeterminate but low scattering level was detectable. It is believed that the incident energy being absorbed by mixture 406B is used to raise the energy state of the molecules contributing to increased vibrational-rotational transitions which is further transmitted via collisions or as non-radiative transistions.

Obviously many modifications and variations of the present invention are possible in the light of the above teachings. It is therefore to be understood that within the scope of the appended claims the invention may be practiced otherwise than as specifically described.

What is claimed is:

1. An effective countermeasure system against laser beam target designators, comprising:
    a. an aerosol resonance absorption material having laser energy absorbing and attenuating properties;
    b. means for deploying and interposing said aerosol material into the atmosphere in a path between the source of said laser energy and a target and between reflected laser energy from a target and a laser energy seeking guidance device;
    c. said aerosol material, when deployed and interposed in the path of laser energy, significantly reducing the laser energy by absorption and attenuation of the laser beam, said laser energy being absorbed by the aerosol material with subsequent redistribution of the energy into any of the vibrational and rotational states and preventing the instantaneous re-emission of the original optical energy of the laser;
    d. said aerosol material also reducing the intensity of any reflected incident energy from the target as a result of a second attenuation as any such reflected energy attempts to pass a second time through an absorbing aerosol medium;
    e. said aerosol material being non-toxic and providing no visible trace thereof when dispersed into the atmosphere in the paths of laser radiation.

2. A system as in claim 1 wherein said aerosol material is contained in and remotely delivered to a strategic site for deployment and dispersal into the atmosphere in said laser path by an aerial detonating mortar canister.

3. A system as in claim 1 wherein said aerosol is a vapor material.

4. A system as in claim 1 wherein said aerosol is a gaseous material.

5. A system as in claim 1 wherein said means for deploying the aerosol material is a ground based agricultural type aerosol generator.

6. A system as in claim 1 wherein said means for deploying the aerosol material is an aircraft.

7. A system as in claim 1 wherein said aerosol resonance absorption material also has the capability of absorbing 1.06 micron laser radiation.

8. A system as in claim 1 wherein said aerosol resonance absorbing material consists of approximately by weight: 80 percent isopropyl alcohol, 15 percent butyl Cellosolve, and 5 percent ethylene glycol.

9. A system as in claim 8 wherein each of said percentages are varied from 10 to 20 percent with only marginal differences in the laser absorbing effect.

10. A non-toxic laser energy resonance absorbing aerosol material, consisting of:
    a. 80 percent by weight isopropyl alcohol;
    b. 15 percent by weight butyl Cellosolve;
    c. 5 percent by weight ethylene glycol;
    d. said aerosol material when dispersed into the atmosphere providing a laser energy absorbing medium without providing a visible trace thereof.

11. The laser absorbing aerosol material of claim 10 wherein each of said percentages can be varied from 10 to 20 percent without materially changing the laser absorbing effect thereof.

* * * * *